United States Patent [19]
Ramakrishnan

[11] Patent Number: 6,167,029
[45] Date of Patent: Dec. 26, 2000

[54] SYSTEM AND METHOD FOR INTEGRATED DATA FLOW CONTROL

[75] Inventor: Gopal Ramakrishnan, Fremont, Calif.

[73] Assignee: XaQti Corporation, Santa Clara, Calif.

[21] Appl. No.: 09/179,538

[22] Filed: Oct. 26, 1998

Related U.S. Application Data

[60] Provisional application No. 60/104,315, Oct. 13, 1998.
[51] Int. Cl.[7] .................................................. G06F 13/00
[52] U.S. Cl. ........................................... 370/235; 709/235
[58] Field of Search ............................ 709/235; 370/235, 370/231, 230, 232, 237

[56] References Cited

U.S. PATENT DOCUMENTS

| | | | |
|---|---|---|---|
| 5,905,870 | 5/1999 | Mangin et al. | 709/234 |
| 5,982,778 | 11/1999 | Mangin et al. | 370/445 |
| 5,995,488 | 11/1999 | Kalkunte et al. | 370/232 |
| 6,026,075 | 2/2000 | Linville et al. | 370/236 |
| 6,031,821 | 2/2000 | Kalkunte et al. | 370/235 |
| 6,035,333 | 3/2000 | Jeffries et al. | 709/224 |
| 6,084,856 | 7/2000 | Simmons et al. | 370/235 |

OTHER PUBLICATIONS

Patrick Van Eijk, "Gigabit Ethernet: Technology, Systems, And Network Applications", Electronic Design, Apr. 1, 1997.

Rich Seifert, "IEEE 802.3x and Asymmetrical Flow Control", IEEE 802.3z Gigabit Ethernet Task Force, Nov. 1996, Vancouver, BC.

Bill Bunch, "Asymmetric Flow Control (AFC) and Gigabit Ethernet", IEEE 802.3z Gigabit Ethernet Task Force, Nov. 5, 1996, Rev. 1.0.

Architecture and Apparatus for Implementing Flow Control in an Ethernet Adapter; IBM Research Disclosure 413128, Sept. 1998.

Primary Examiner—Kenneth R. Coulter
Attorney, Agent, or Firm—Beyer Weaver&Thomas LLP

[57] ABSTRACT

A network communication controller that provides for rapid detection of available buffer capacity and transmission of pause frames as needed to provide flow control is described. The transmission of a pause frame is requested when a reception buffer capacity achieves an almost full condition. Additionally, an almost empty condition can be used to trigger the transmission of another pause frame. In either case, the pause frames are automatically generated and transmitted ahead of other frames that may also be waiting for transmission. Preferably, the network communication controller is an integrated circuit including circuitry for a MAC layer and a MAC control layer. The flow control provided by the invention is particularly suitable for high speed networks, e.g., 1 Gbps Ethernet networks.

25 Claims, 12 Drawing Sheets

SYSTEM AND METHOD FOR INTEGRATED DATA FLOW CONTROL

CROSS-REFERENCE TO RELATED APPLICATION

This application claims the benefit of Provisional Patent Application Ser. No. 60/104,315, filed Oct. 13, 1998 and entitled "SYSTEM AND METHOD FOR INTEGRATED DATA FLOW CONTROL," which is hereby incorporated by reference.

BACKGROUND OF THE INVENTION

1. Field of the Invention

The present invention relates generally to communication networks. More particularly, the present invention relates to a system and method for providing flow control in communication networks.

2. Description of the Related Art

Local Area Networks (LANs) have been very popular for many years. One particularly type of LAN is known as Ethernet. Since Ethernet's beginnings in the early 1970's, computer networking companies and engineering professionals have continually worked to improve Ethernet product versatility, reliability and transmission speeds. To ensure that new Ethernet products were compatible and reliable, the Institute of Electrical and Electronic Engineers (IEEE) formed a working group to define and promote industry LAN standards. Today, the IEEE has various Ethernet working groups that are responsible for standardizing the development of new Ethernet protocols and products under an internationally well known LAN standard called the "IEEE 802.3 standard."

Currently, there are a wide variety of standard compliant Ethernet products used for receiving, processing and transmitting data over Ethernet networks. By way of example, these networking products are typically integrated into networked computers, network interface cards (NICs), routers, switching hubs, bridges and repeaters. Until recently, common data transmission speeds over Ethernet networks were between 1 and 10 mega bits per second (Mbps). However, to meet demands for faster data transmission speeds, the IEEE 802.3 standards committee officially introduced the "IEEE 802.3u standard" in May of 1995. This standard is also referred to as the "100BASE-T" (Fast Ethernet) standard because of its ability to perform data transmissions up to about 100 Mbps. Ethernet networks capable of speeds approaching 1 giga bits per second (Gbps) are currently in development.

FIG. 1 is a diagrammatic representation of an open systems interconnection (OSI) layered model 10 developed by the International Organization for Standards (ISO). The OSI layered model 10 describes the exchange of information between various layers of a network. The OSI layered model 10 is particularly useful for separating the technological functions of each layer, and thereby facilitating the modification or update of a given layer without detrimentally impacting the operation of neighboring layers.

At a lower most layer, the OSI model 10 has a physical layer 12 that is responsible for encoding and decoding data into signals that are transmitted across a particular medium. Above the physical layer 12, a data link layer 14 is defined for providing reliable transmission of data over a network while performing appropriate interfacing with physical layer 12 and a network layer 16. As shown in FIG. 1, the data link layer 14 generally includes a logical link layer (LLC) 14a and a media access control (MAC) layer 14b. The LLC layer 14a is generally a software function that is responsible for attaching control information to the data being transmitted from a network layer 16 to the MAC layer 14b. The MAC layer 14b is responsible for scheduling, transmitting and receiving data over a link. Thus, the MAC layer 14b is primarily responsible for controlling the flow of data over a network, ensuring that transmission errors are detected, and ensuring that transmissions are appropriately synchronized. As is well known in the art, the MAC layer 14b generally schedules and controls the access of data to the physical layer 12 using a well known carrier sense multiple access with collision detection (CSMA/CD) algorithm for half duplex mode of operation.

The network layer 16 is provided above the data link layer 14 and is responsible for routing data between nodes in a network, and for initiating, maintaining and terminating a communication link between users connected to the nodes. A transport layer 18 is responsible for performing data transfers within a particular level of service quality. By way of example, a typical software protocol used for performing the transport layer 18 functions may be TCP/IP, Novell IPX and NetBeui. A session layer 20 is provided above the transport layer 18. The session layer 20 is generally concerned with controlling when users are able to transmit and receive data based on whether users are capable of full-duplex or half-duplex transmission. Above the session layer 20 is a presentation layer 22 and then above that is an application layer 24. The presentation layer 22 is responsible for translating, converting, compressing and decompressing data being transmitted across a medium. As an example, the presentation layer 22 functions are typically performed by computer operating systems such as UNIX, DOS, Microsoft Windows, Windows NT and Macintosh OS. Finally, the application layer 24 provides users with suitable interfaces for accessing and connecting to a network.

FIGS. 2A–2C are block diagrams of interconnected points (stations) in a network. A point may be a network in itself, a single computer system, or any intermediate point in a network such as a router, switching hub, bridge or repeater. FIG. 2A illustrates a configuration in which two points, point A 50 and point B 52, communicate with each other in a bidirectional manner. FIG. 2B illustrates a configuration where a multipoint switching hub 54 facilitates communication between points 56a–56c. FIG. 2C illustrates a configuration where two multipoint switching hubs 54a and 54b are coupled together and facilitate communication between points 56d–56i.

Each point shown in FIGS. 2A–2C processes incoming and outgoing data independently from every other point. The various points provide full duplex communications. In order to accommodate the different transmit and receive data processing speeds at the various points, buffers are typically used to temporarily store data to be processed. The data being stored represents either data to be transmitted or data that has been received and is awaiting processing. Accordingly, if point 50 of FIG. 2A transmits at a speed faster than point 52 can process received data, then point 52 may utilize a receive buffer (not shown) to store data which has been received by point 52 but not yet processed. In such a case, a problem may arise if enough data has been transmitted from point 50 to the receive buffer at point 52 such that the receive buffer becomes full. When the receive buffer becomes full, there is no conventional way to rapidly notify point 50 that the receive buffer of point 52 is full. If point 50 continues to transmit data faster than the speed at which point 52 is processing the received data, data packets transmitted by point 50 will be lost. The loss of data packets substantially degrades the performance of the network, and in particular transmissions between points 50 and 52.

Recently, to provide for flow control for transmissions and thus alleviate the loss of frames (or packets) when a receive buffer is full, a technique for sending a pause frame was added to the 802.3 IEEE standard for full duplex links. The technique is described in IEEE 802.3x standard. According to the IEEE 802.3x standard, devices desiring to stop the flow of incoming frames from a transmitting device can send that transmitting device a pause frame. The pause frame contains a pause time. Pause frames are treated as special types of control frames. Upon receiving the pause frame, the transmitting device is to "pause" its transmissions to the receiving device for the pause time. A MAC control layer 14c is added between the MAC layer 14b and the LLC layer 14a shown in FIG. 3 to produce the pause control operations. The IEEE 802.3x standard does not specify or require any particular implementation of the standard or policies used to send the pause frames. The IEEE 802.3x standard is hereby incorporated by reference.

Conventional implementations of the 802.3x standard have used circuitry located external to a MAC integrated circuit. The external circuitry would monitor a receive buffer and determine when a pause frame needs to be transmitted. When it is determined to transmit a pause frame, the external circuitry would signal the MAC integrated circuit through a dedicated pin to send a pause frame.

The conventional implementations of the 802.3x standard suffer from various problems. One problem is that the responsiveness of the circuitry (device) to a condition where a pause frame is needed is poor. Namely, when the dedicated pin is asserted by the external circuitry to request the transmission of a pause frame, the MAC integrated circuit understands that a pause frame should be transmitted. However, the pause frame is sometimes not able to be immediately transmitted because of congestion due to other frames waiting to be transmitted. Normally, data and control frames share a transmission data path and thus congestion results from both data frames and control frames. Such congestion can be referred to as queuing delays. While devices can have separate data paths for data and control frames, such devices are substantially more costly to design and manufacture. Thus, poor responsiveness in transmitting a pause frame can result due to congestion. Poor responsiveness also results from the inherent time delay associated with the external circuitry's latency in monitoring a receive buffer to determine when a pause frame is needed and then activating the dedicated pin on the MAC integrated circuit. The undesirable consequence of poor responsiveness is that the pause frame arrives at the transmitting device after a significant amount of data has been transmitted. As a result, the receive buffer can easily overflow and degrade performance, particularly at higher speed communications such as 100 Mbps and 1 Gbps.

Thus, there is a need to have a system and method for controlling the flow of data between points in a network environment such that the amount of transmitted data lost is reduced.

SUMMARY OF THE INVENTION

Broadly speaking, the invention relates to a network communication controller that provides for rapid detection of available buffer capacity and transmission of pause frames as needed to provide flow control.

The transmission of a pause frame is requested when a reception buffer capacity achieves an almost full condition. The almost full condition level can be system or user programmable. Additionally, an almost empty condition can be used to trigger the transmission of another pause frame. The almost empty condition level can also be system or user programmable. In either case, the pause frames are automatically generated and transmitted ahead of other frames that may also be waiting for transmission. Preferably, the network communication controller is an integrated circuit including circuitry for a MAC layer and a MAC control layer.

The invention can be implemented in numerous ways, including as a method, an apparatus, a circuit, and a computer system. Several embodiments of the invention are discussed below.

As a method for requesting a pause in transmission of data from a source station to a destination station, where the source station and the destination station are coupled together in a full duplex manner, an embodiment of the invention includes the acts of: receiving a frame of data at the destination station from the source station; storing the received frame in a receive buffer; monitoring a level indicator that indicates extent to which the capacity of the receive buffer is being utilized; comparing the level indicator for the receive buffer with at least one level threshold; generating a pause frame to inform the source station of the available capacity of the receive buffer when the comparing determines that the level indicator for the receive buffer does exceed the at least one level threshold; and transmitting the pause frame from the destination station to the source station, the transmission of the pause frame given priority over other frames to be transmitted from the destination station.

As an integrated circuit for supporting a network connection, an embodiment of the invention includes: a transmit buffer for storing outgoing frames to be transmitted to a remote station; a receive buffer for storing incoming frames; a pause frame controller that evaluates utilized capacity of the receive buffer and issues an internal pause frame request when the utilized capacity exceeds a threshold amount; and a pause frame generator, operatively connected to the pause frame controller, the pause frame generator generates a pause frame when the pause frame controller issues the internal pause frame request.

As a system for providing flow control between first and second stations of a network coupled in a full-duplexed manner, an embodiment of the invention provides the first station with at least a transmit buffer for storing outgoing frames to be transmitted to the second station, a receive buffer for storing incoming frames, a pause frame controller that evaluates utilized capacity of the receive buffer and issues an internal pause frame request when the utilized capacity exceeds a threshold amount, and a pause frame generator that generates a pause frame when the pause frame controller issues the internal pause frame request. The invention also provides the second station with a transmit buffer for storing outgoing frames to be transmitted to the first station, a receive buffer for storing incoming frames, and a frame controller that interrupts the transmission of outgoing frames for a period of time when the pause frame transmitted by the first station is received and detected at the second station.

The advantages of the invention are numerous. Different implementations of the invention may have different advantages. One advantage of the invention is that pause frames can be sent more rapidly than conventionally possible. As a result, network performance tends to improve because network congestion and inter-chip latencies are able to be avoided. Another advantage of certain embodiments of the invention is that a user or system can programmably adjust or vary the amount of advance warning of buffer overflow and/or underflow.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a network communication controller that provides for rapid detection of available buffer capacity and transmission of pause frames as needed to provide flow control. Flow control is know to be helpful in improving network performance. The flow control provided by the invention is automatic or integral and therefore substantially improved. The flow control provided by the invention is particularly suitable for high speed networks, e.g., 1 Gbps Ethernet networks.

The transmission of a pause frame is requested when a reception buffer capacity achieves an almost full condition. The almost full condition level can be system or user programmable. Additionally, an almost empty condition can be used to trigger the transmission of another pause frame. The almost empty condition level can also be system or user programmable. In one embodiment, when the almost full condition level is reached a pause frame with a non-zero timer value is requested, and when the almost empty condition level is reached a pause frame with a zero timer value is requested. The pause frames are automatically generated and transmitted ahead of other frames that may also be waiting for transmission. Preferably, the network communication controller is an integrated circuit including circuitry for a MAC layer and a MAC control layer.

Embodiments of this aspect of the invention are discussed below with reference to FIGS. 4–12. However, those skilled in the art will readily appreciate that the detailed description given herein with respect to these figures is for explanatory purposes as the invention extends beyond these limited embodiments.

Figure 1:
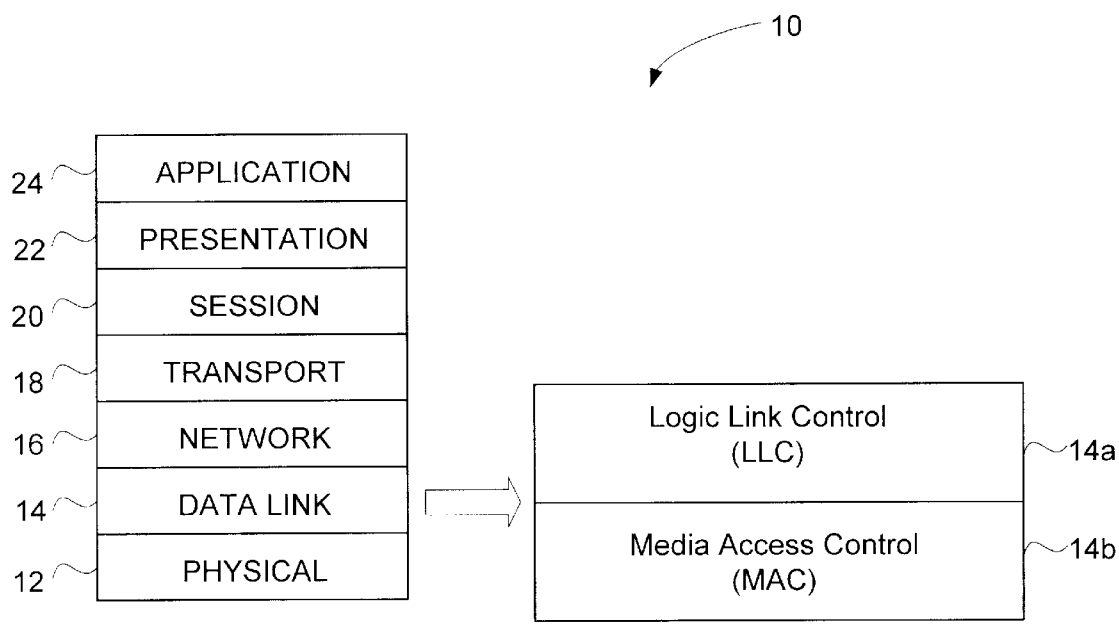
FIG. 1 is a diagrammatic representation of an open systems interconnection (OSI) layered model developed by the International Organization for Standards (ISO)
Figure 2A:
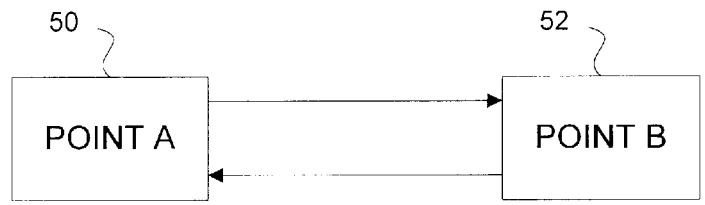
FIGS. 2A–2C are block diagrams of interconnected points (stations) in a network.
Figure 2B:
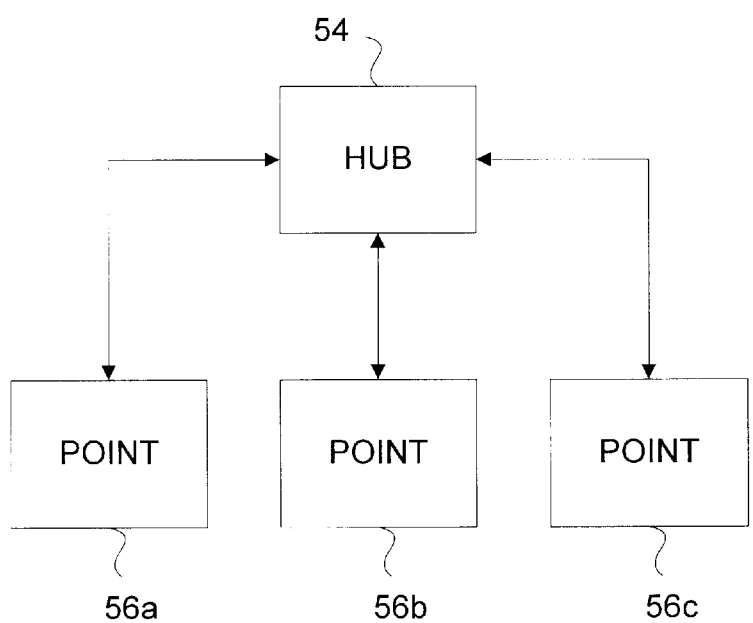
Figure 2C:
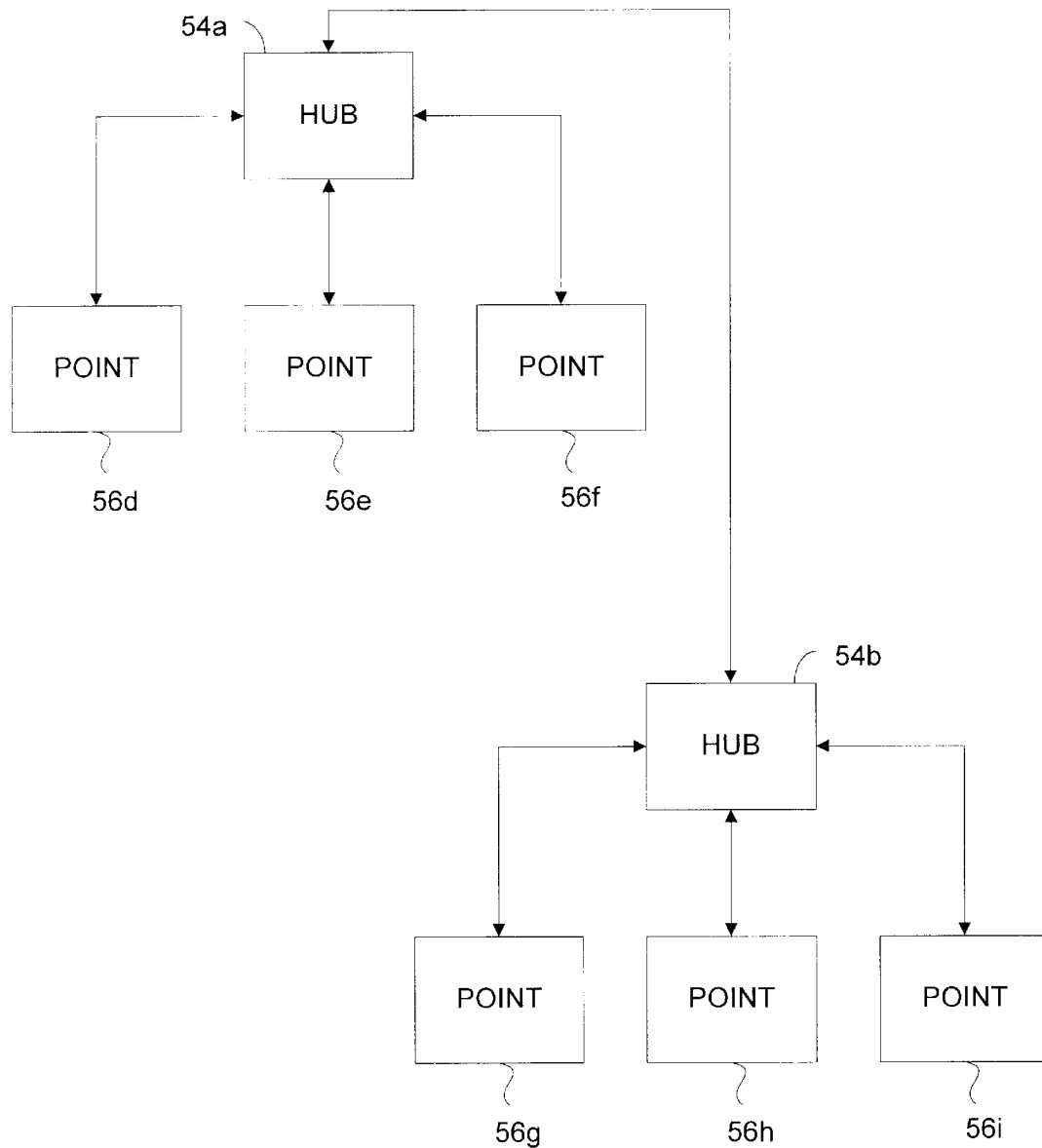
Figure 3:
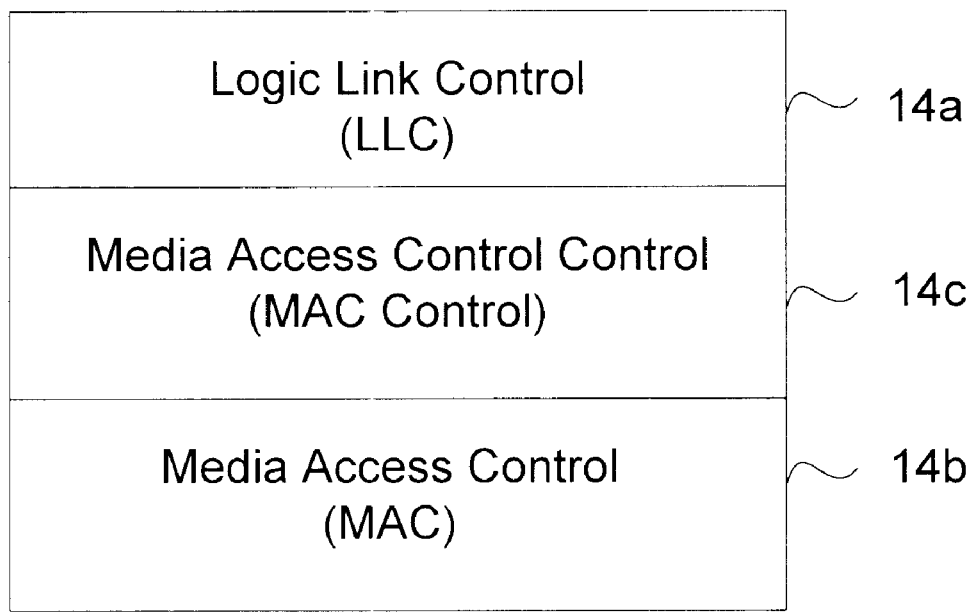
FIG. 3 is a diagrammatic representation of a modified OSI layered model in which a MAC control layer is added support to support the pause control operations.
Figure 4:
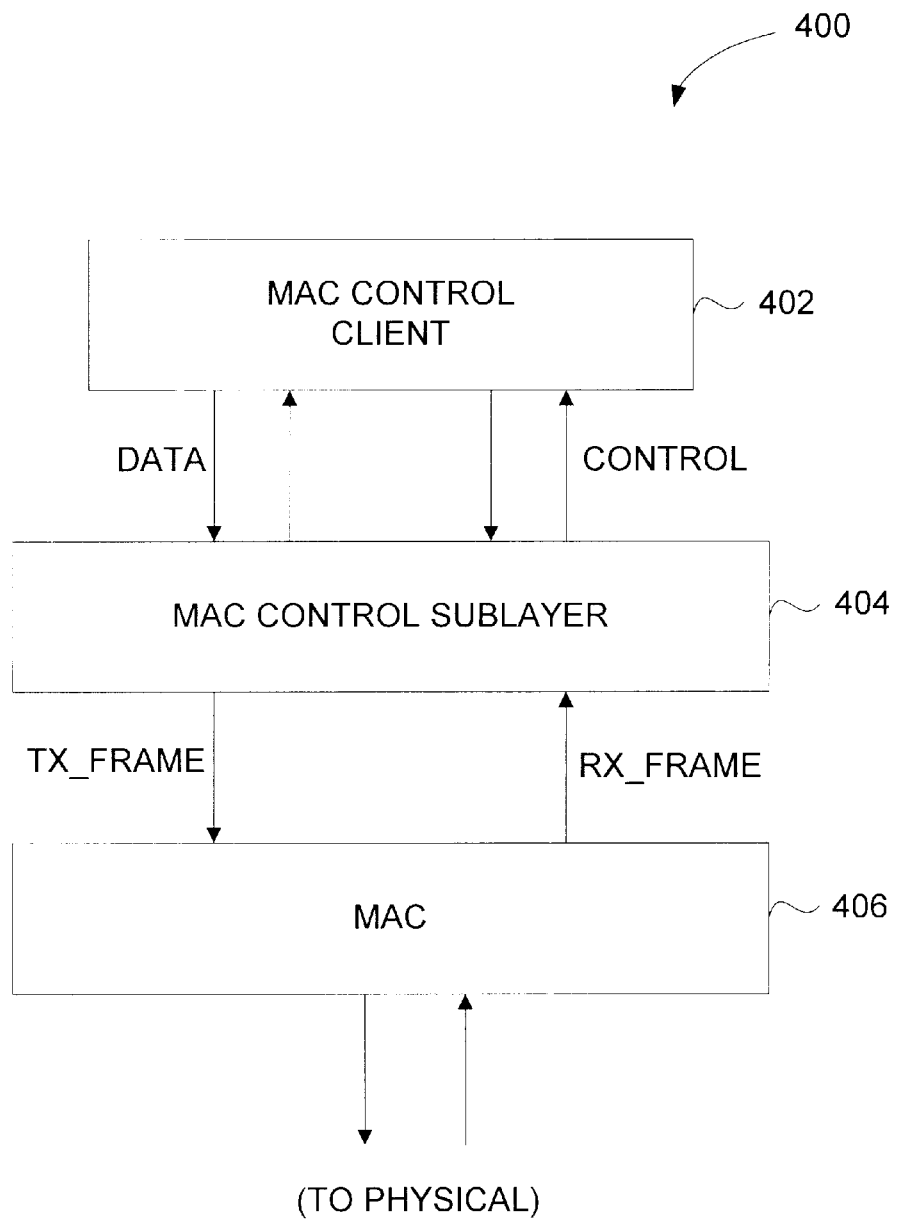
FIG. 4 is a diagrammatic representation of components which are included in a data link layer that is suitable for implementation of an embodiment of the invention.

FIG. 4 is a diagrammatic representation of components which are included in a data link layer 400 that is suitable for implementation of an embodiment of the invention. The data link layer 400 includes a MAC control client 402 (e.g., logic link control (LLC)), a media access control (MAC) control sublayer 404, and a media access control (MAC) 406. The MAC control client 402 is generally a software function that is responsible for attaching control information to the data being transmitted from a network layer to the MAC 406. The MAC control client 402 sends data and control information to the MAC control sublayer 404 and also receives data and control information from the MAC control sublayer 404. The MAC 406 is coupled to a physical layer and is generally responsible for scheduling, transmitting and receiving data over a link. The MAC control sublayer 404 follows the Institute of Electrical and Electronic Engineers (IEEE) standards defined in section 802.3x, which defines standardized flow control. The MAC control sublayer 404 provides transmit frames (TX_FRAME) to the MAC 406 as well as receives receive frames (RX_FRAME) from the MAC 406. The MAC control sublayer 404 is also the portion of the data link layer 400 that understands and implements pause frames.

A pause frame is a specific frame (or packet) that is use to facilitate flow control with full-duplex communications. The pause frame is transmitted from one station to another to inform that station that data transmission should be temporarily stopped. Upon receiving the pause frame, the station that had been transmitting is instructed to stop transmitting for a period of time.

Figure 5:
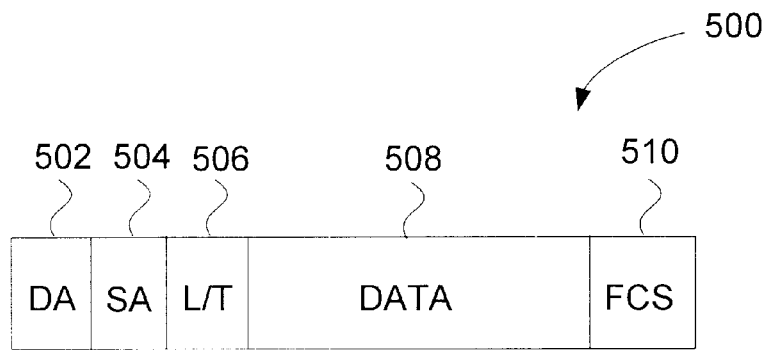
FIG. 5 shows a representative pause frame packet for use with the present invention.

FIG. 5 shows a representative pause frame packet 500 for use with the invention. The representative pause frame packet 500 includes a destination address (DA) 502, a source address (SA) 504, a length/type (L/T) descriptor 506, data 508, and a frame check sequence (FCS) 510. The destination address (DA) 502 indicates the address of the receiving station. The source address (SA) 504 indicates the address of the sending station. The length/type (L/T) descriptor 506 is generally used to indicate the length and type of the data field that follows. The data 508 includes a timer value. The timer value identifies the period of time (pause time) that the sending point should pause (i.e., not transmit). As an example, the timer value can be designated by two (2) bytes, which can cause delays of 0–4 time slots. The frame check sequence 510 allows for a check to determine whether the pause frame had any transmission problems.

The pause frame is a particular type of control frame. The pause frame 500 is similar to other control frames, however, the destination address (DA) 502 of the pause frame 500 is preferably fixed. This fixed destination address (DA) 502 is referred to as a multicast address that is reserved for pause frames.

Similar to other data packets, the pause frame 500 would generally include a preamble. An example of the size of the preamble is 8 bytes long. An example of a size of the destination address (DA) 502 is 6 bytes. An example of the size of the source address 504 is 6 bytes. An example of the length/type descriptor field 506 is 2 bytes.

Figure 6:
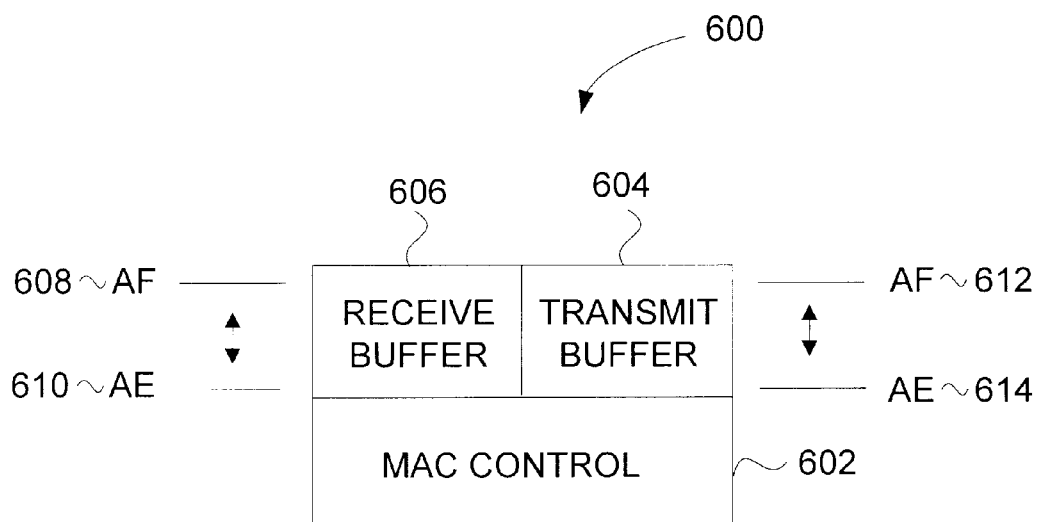
FIG. 6 is a diagrammatic representation of flow control system according to an embodiment of the invention.

FIG. 6 is a diagrammatic representation of flow control system 600 according to an embodiment of the invention. According to the invention, the flow control system 600 is provided within an integrated circuit that also includes the MAC (e.g., MAC 406). In other words, the buffers for transmission and reception as well as the MAC and the MAC control are contained within a single integrated circuit. This arrangement yields what is referred to as integrated flow control.

The flow control system 600 includes a MAC control 602, a transmit buffer 604, and a receive buffer 606. Typically, the buffers 604 and 606 are FIFOs. The MAC control 602 is coupled with the receive buffer 606 and the transmit buffer 604. When frames (more generally, data) from a sending station are received at a receiving station, the received frames are buffered in the receive buffer 606. Further, frames (more generally, data) outgoing from a sending station to a receiving station are buffered in the transmit buffer 604.

The received buffer 606 is associated with a level indicator that is able to indicate the level of utilization of the storage capacity of the buffer. Specifically, the level indicator signals two levels, an almost full (AF) level 608 and an almost empty (AE) level 610. The AF level 608 indicates that the amount of data stored in the receive buffer 606 is nearing its maximum capacity. As an example, the AF level 608 can indicate that the receive buffer 606 is at 95% capacity. Similarly, the AE level 610 indicates that the amount of data stored in the receive buffer 606 is nearing its minimum capacity. As an example, the AE level 610 can indicate that the receive buffer 606 is at 5% capacity. For example, if the receive buffer were 8 kilobytes (kB), then the AF level could be about 7.6 kB and the AE level could be about 0.4 kB.

When the amount of data stored in the receiving buffer 606 reaches the AF level 608, then the MAC control 602 produces and issues a pause frame to a sending station to inform to the sending station that data transmission (to the receiving buffer 606) should temporarily be stopped. The production and issuance of the pause frame are automatically performed by the MAC control 602. Accordingly, the pause frame is generated internally so that it is able to be sent with less delay and more control. Hence, the flow control system 600 operates without any need for external controls. However, if desired, the integrated circuit housing the flow control system 600 can also accept external controls in the event that external circuitry is also able to initiate the production and issuance of a request for a pause frame.

Likewise, when the amount of data stored in the receiving buffer 606 reaches the AE level 610, then the MAC control 602 produces and issues a pause frame to a sending station to inform to the sending station that data transmission should be resumed. This pause frame, which is generated when the AE level 610 is reached, includes a pause time of zero, such that the sending point may immediately resume data transmission. The pause frame with a zero pause time can also be referred to as a resume frame.

The AF and AE levels are preferably user configurable. In one embodiment, a user or system can configure the AF and AE levels, also known as threshold levels, by storing appropriate values in registers within the integrated circuit housing the flow control system. Such an embodiment could also include registers to store the various fields of a pause frame such as shown in FIG. 5. It is likely the case that different AF and AE levels will be set to different capacity levels depending on the speed of the network link between the sending station and the receiving station.

Likewise, on the transmit side, the transmit buffer 604 may also be associated with a level indicator that is able to signal either of two levels, an almost full (AF) level 612 and an almost empty (AE) level 614. The AF level 612 indicates that the amount of data stored in the transmit buffer 604 is nearing its maximum capacity. As an example, the AF level 612 can indicate that the transmit buffer 604 is at 95% capacity. Similarly, the AE level 614 indicates that the amount of data stored in the transmit buffer 604 is nearing its minimum capacity. As an example, the AE level 614 can indicate that the transmit buffer 604 is at 5% capacity. For example, if the transmit buffer were 4 kilobytes (kB), then the AF level could be about 3.8 kB and the AE level could be about 0.2 kB.

As previously mentioned, the invention monitors the available capacity of buffers used in transmitting and receiving frames or packets of data between stations. Specifically, a typical situation is where station 1 is transmitting to station 2 while, at the same time, station 2 is transmitting to station 1. When the data rate of the transmissions from station 1 to station 2 causes the receive buffer at station 2 to fill-up such that the amount of data stored in the buffer is nearly at its maximum capacity, then station 2 operates to produce and transmit a pause frame to station 1. Upon receiving the pause frame, station 1 ceases to transmit frames or packets of data to station 2 for a predetermined period of time or until instructed otherwise by station 2. Because no external circuitry is involved in the flow control processing, the transmission and reception of pause frames is very rapid as compared to conventional designs which relied on external circuitry.

The processing associated with providing flow control according to the invention is described in more detail below in FIGS. 7 and 8. The processing is described with reference to the situation noted above where station 1 is transmitting frames to station 2 and, at the same time, station 2 is transmitting frames to station 1. Our discussion below will focus on the receiving of frames at station 2 and the transmitting of frames from station 1.

Figure 7:
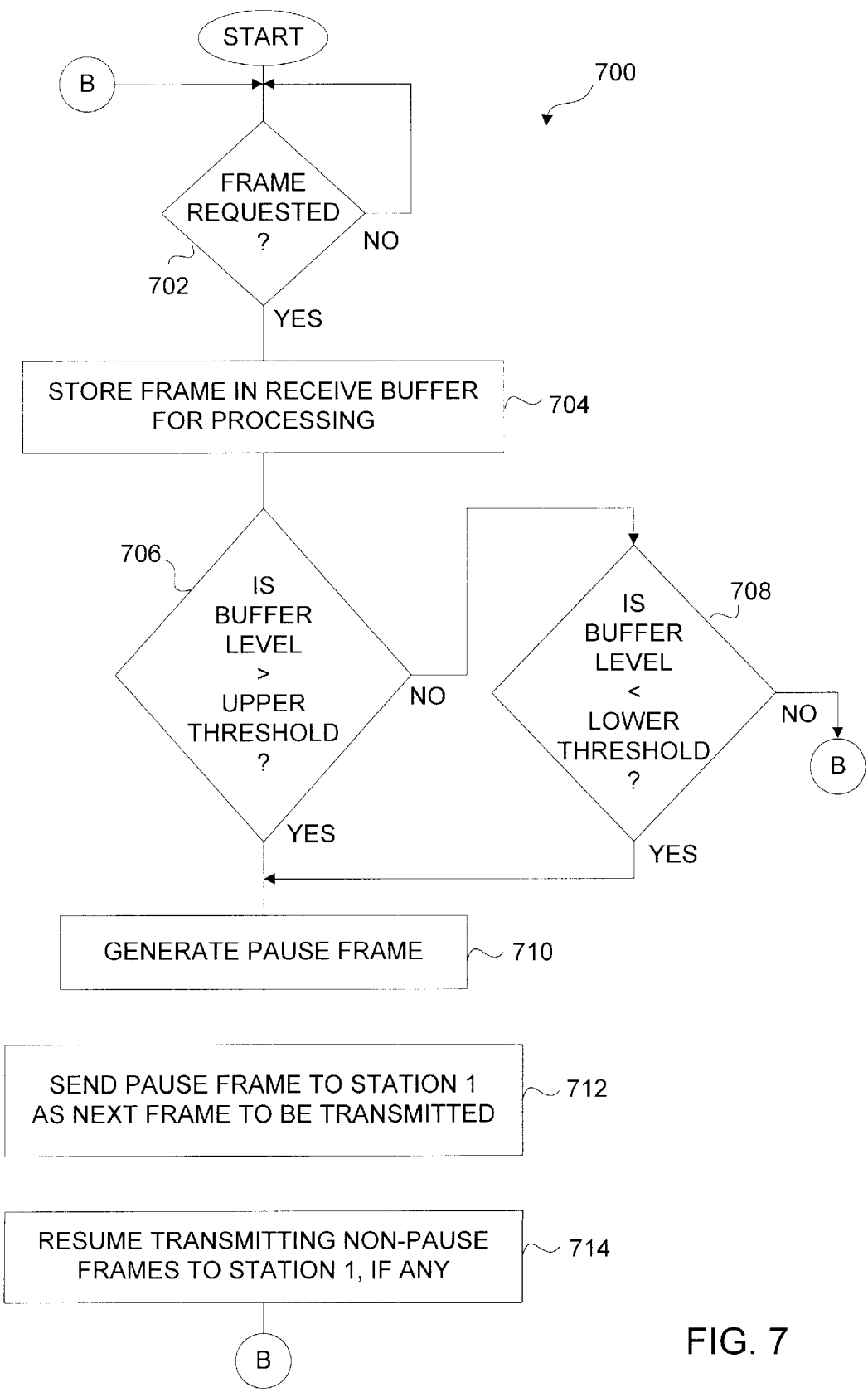
FIG. 7 is a flow diagram of reception side pause control processing according to an embodiment of the invention.

FIG. 7 is a flow diagram of reception side pause control processing 700 according to an embodiment of the invention. The reception side pause control processing 700 is discussed below with reference to station 2 and the above-mentioned situation.

The reception side control processing 700 begins with a decision block 702 that determines whether a frame has been received. For example, with respect to station 2, the decision block 702 determines whether station 2 has received a frame. Until a frame has been received, the reception side pause control processing 700 awaits the reception of the frame. Independently, there can be concurrent transmission of frames (e.g., from station 2 to station 1).

Once a frame has been received, the frame is stored 704 in a receive buffer for processing. Additionally, a decision block 706 determines whether the buffer level is greater than an upper threshold. When the buffer level is determined to be greater than the upper threshold, then the reception side pause control processing 700 understands that a pause frame will need to be generated and transmitted. On the other hand, when the decision block 706 determines that the buffer level does not exceed the upper threshold, then a decision block 708 determines whether the buffer level is then below a lower threshold. When the buffer level is determined to not be less than the lower threshold, then the current buffer level conditions are such that a pause frame does not need to be generated and transmitted, and as such the reception side pause control processing 700 returns to the decision block 702 to process the reception of a next frame. On the other hand, when the decision block 708 determines that the buffer level is less than the lower threshold, then the reception side pause control processing 700 determines that a pause frame needs to be generated and transmitted to perform flow control. In one embodiment, the lower threshold can correspond to the AE level 610 and the upper threshold can correspond to the AF level 608 for a receive buffer as described above with reference to FIG. 6.

When either of the decision blocks 706 and 708 signal that either of the threshold conditions are exceeded, a pause frame is then generated 710. A representative format for a pause frame would be the pause frame 500 described above with reference to FIG. 5.

Next, the pause frame is sent 712 to station 1 as a next frame to be transmitted. For example, if the pause frame is generated while the station 2 is in the process of transmitting a particular frame to station 1, then the transmission of the particular frame is completed. Then, as soon as the transmission of the particular frame is complete, the pause frame is the next frame to be transmitted. After the pause frame has been sent, the transmitting of non-pause frames to station 1, if any, is resumed 714. By transmitting the pause as the next frame, the pause frame is given priority over other frames that may happen to be waiting for transmission. As a result, any congestion at a transmit side is able to be bypassed.

Following block 714, the reception side pause control processing 700 returns to repeat the decision block 702 and subsequent blocks. In this manner, the reception side pause control processing 700 is ready to receive and process another received frame.

Figure 8:
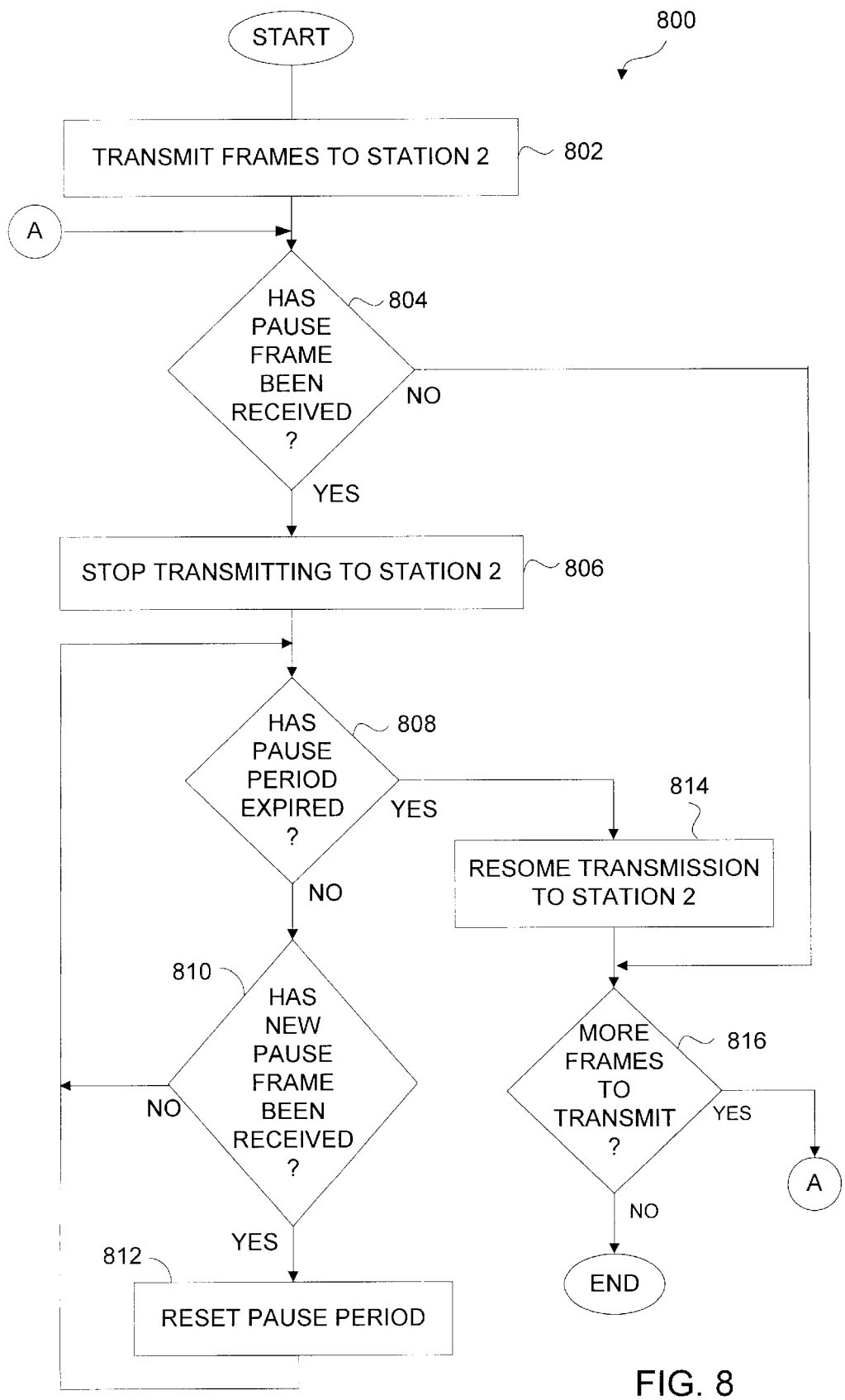
FIG. 8 is a flow diagram of transmission side pause control processing according to an embodiment of the invention.

FIG. 8 is a flow diagram of transmission side pause control processing 800 according to an embodiment of the invention. The transmission side pause control processing 800 is discussed below with reference to station 1 in the above-mentioned situation.

The transmission side pause control processing 800 begins by transmitting 802 frames from station 1 to station 2. In general, stations 1 and 2 are assumed to communicate in a bidirectional or full-duplex manner. Next, a decision block 804 determines whether a pause frame has been received. Here, as frames are being received from station 2 (currently with the transmissions to station 2), each frame is examined to determine whether it is a pause frame. In one embodiment, a pause frame can be easily distinguished by its destination address (DA) which is a predetermined address that is dedicated for pause frames.

When the decision block 804 determines that a pause frame has been received, then the reception side pause control processing 800 performs special actions to service the pause frame that has been received. On the other hand, when the decision block 804 determines that a pause frame has not been received, then the additional processing of pause frames is bypassed.

The special actions performed for a pause frame are as follows. Following the decision block 804 when a pause frame has been received, station 1 stops transmitting 806 to station 2 for a pause period. At this point, it is said that the transmissions have been "paused." In one embodiment, the pause frame specifies the pause period during which the transmissions are to cease.

Then, a decision block 808 determines whether the pause period has expired. The pause period is used by the transmitting side (e.g., station 1) to incur a delay (or pause) in the transmission to another station. Hence, the decision block 808 determines whether a particular pause period that has been established has now expired.

If the decision block 808 determines that the pause period has not expired, then a decision block 810 determines whether a new pause frame has been received in the interim. When the decision block 810 determines that a new pause frame has not been received, then the transmission side pause control processing 800 returns to repeat the decision block 808 and subsequent blocks so that the pause period can be continuously monitored to detect its expiration. On the other hand, when the decision block 810 determines that a new pause frame has been received, then the pause period is reset 812 in accordance with the pause period associated with the new pause frame. Following block 812, the transmission side pause control processing 800 returns to repeat the decision block 808 and subsequent blocks.

When the decision block 808 determines that the pause period has expired, then transmission of frames to station 2 is resumed 814. The decision block 808 can determine that the pause period has expired for either the initial pause frame or a subsequently received newer pause frame, whichever was received last. In any case, when the currently active pause period expires, the transmission of frames to station 2 is resumed 814 because the pause period is over.

Following block 814 as well as directly following the decision block 804 when it is determined that a pause frame has not been received, a decision block 816 determines whether there are more frames to transmit. When the decision block 816 determines that there are more frames to transmit, then the transmission side pause control processing 800 returns to repeat the decision block 804 and subsequent blocks so that the additional frames can be transmitted, although potentially interrupted for typically brief periods due to the reception of pause frames. Alternatively, when a decision block 816 determines that there are no more frames to transmit, then the transmission side pause control processing 800 is complete and ends.

Figure 9:
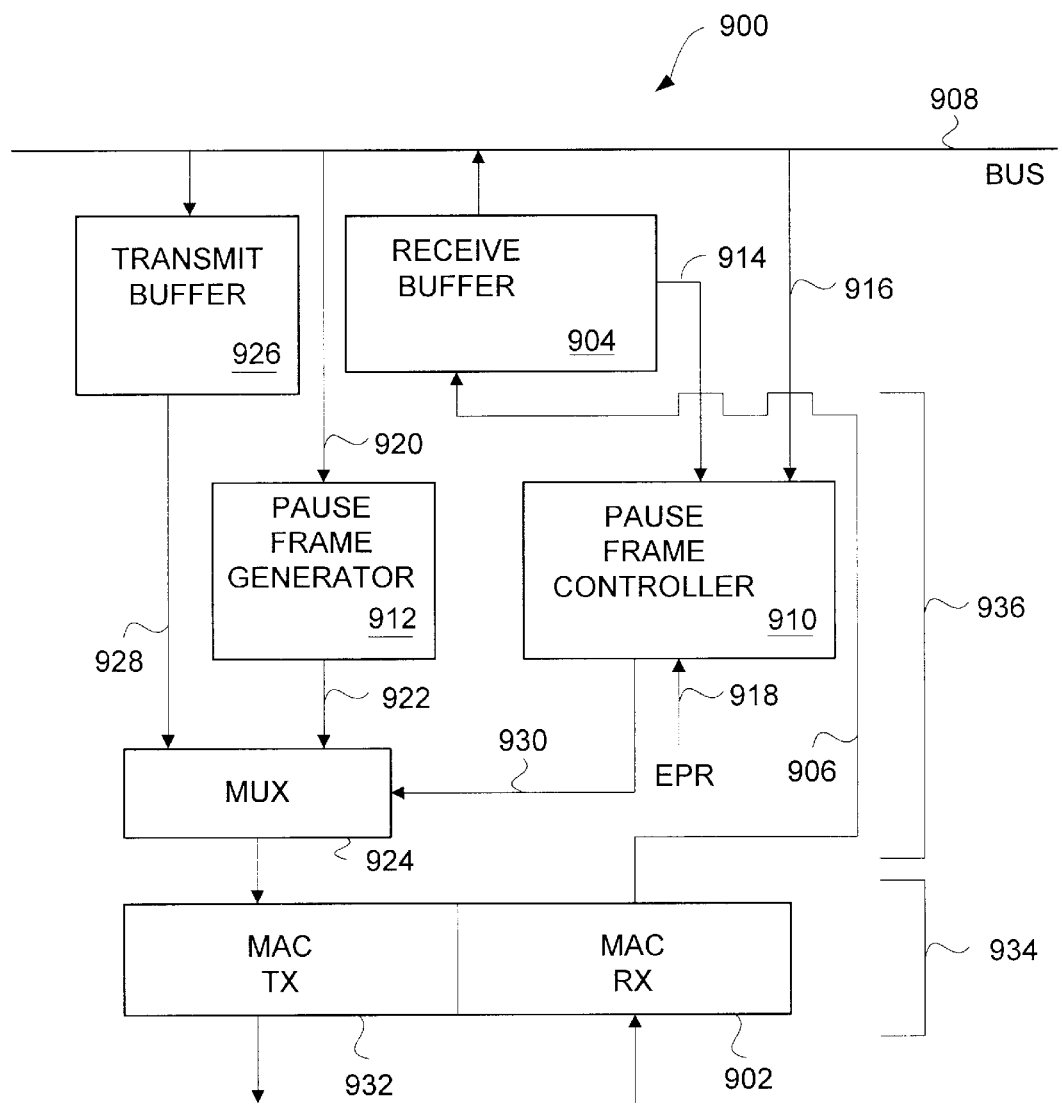
FIG. 9 is a block diagram of a reception controller with integrated flow control according to an embodiment of the invention.

FIG. 9 is a block diagram of a reception controller 900 with integrated flow control according to an embodiment of the invention. The reception controller 900 is illustrated in FIG. 9 from the perspective of a receiving station such as station 2 in the representative situation noted above.

The reception controller 900 includes a receive side media access control (MAC) 902 which receives incoming frames to the reception controller 900. The incoming frames that are received by the receive side MAC 902 are forwarded to a receive buffer 904 via a data path 906. The receive buffer 904 is coupled not only to the data path 906 but also to bus 908.

The reception controller 900 also includes a pulse frame controller 910 and a pulse frame generator 912. The pulse frame controller 910 receives buffer level information from the receive buffer 904 over signal lines 914. Using the buffer level information, the pause frame controller 910 can determine whether a pause frame is necessary. In one embodiment, the buffer level information is compared with threshold settings stored or accessible to the pause frame controller 910. As an example, registers provided within or accessible to the pulse frame controller 910 can be set through signal lines 916 via the bus 908. Typically, the bus 908 is accessible to a Central Processing Unit (CPU) of a computer system that includes a network communications integrated circuit that includes the reception controller 900. Through the bus 908 then the CPU is able to set the registers which can be used to store the threshold settings. The pause frame controller 910 can also determine that a pause frame is necessary. Here, the pause frame generator 912 can receive an external pulse request (EPR) signal 918. The EPR signal 918 can be provided by external circuitry in a case in which the system desires to use external logic and processing to request that a pause frame be issued. In any case, the pause frame controller 910 determines when a pause frame is necessary.

The pause frame generator 912 is coupled to the bus 908 over signal lines 920. The signal lines 920 can be used to set internal registers within the pulse frame generator 912. In one embodiment, the CPU is able to set the internal registers via the signal lines 920. These internal registers can store certain fields of the pulse frame to be generated. Representative fields for a pause frame as shown in FIG. 5. The pause frame generator 912 produces a pause frame which is supplied over signal line 922 to a multiplexer 924. The multiplexer 924 also couples to a transmit buffer 926 through a signal lines 928. The transmit buffer 926 is coupled to the bus 908 and stores frames to be transmitted to a remote station. Hence, the multiplexer 924 selects for transmission either the pulse frame generated by the pulse frame generator 912 or a frame from the transmit buffer 926 in accordance with a control signal 930. The control signal 930 is produced by the pulse frame controller 910 whenever a pause frame is to be transmitted. The output of the multiplexer 925 is provided to a transmit side MAC 932. From the transmit side MAC 932, the selected frame is transmitted to a remote station.

The transmit side MAC 932 and the receive side MAC 902 together are conventionally referred to as a MAC layer 934. In addition, the pause frame controller 910, the pause frame generator 912 and the multiplexer 925 are typically associated with a MAC control layer 936.

Figure 10:
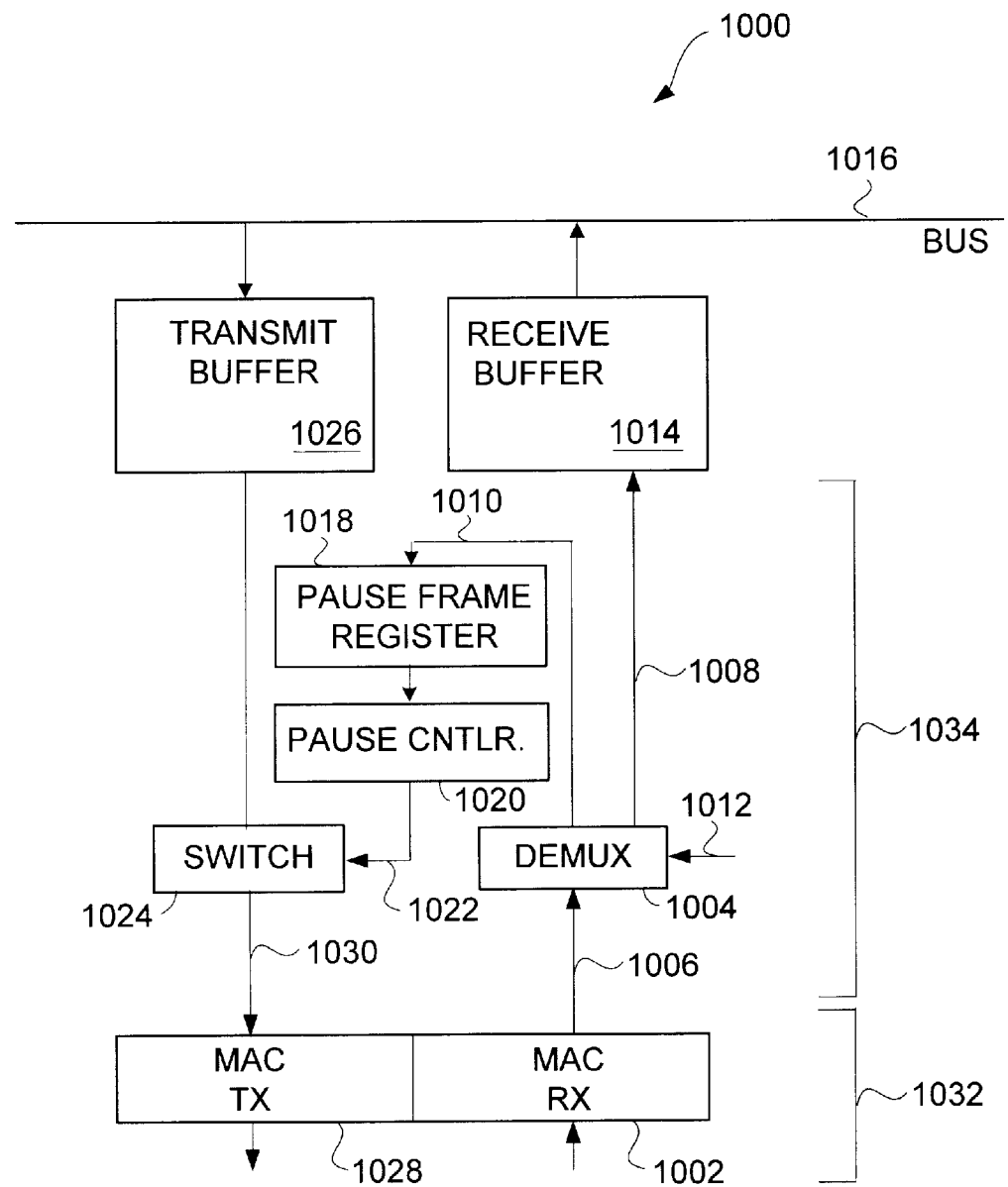
FIG. 10 is block diagram of a transmission controller with integrated flow control according to an embodiment of the invention.

FIG. 10 is block diagram of a transmission controller 1000 with integrated flow control according to an embodiment of the invention. The transmission controller 1000 operates to transmit or interrupt the transmission of frames to a remote station when an incoming frame received from that station has requested a pause. The transmission controller 1000 is illustrated in FIG. 10 from the perspective of a transmitting station such as station 1 in the representative situation noted above.

The transmission controller 1000 receives incoming frames at a receive side MAC 1002. The frames are then forwarded to a demultiplexer 1004 over a data bus 1006. The demultiplexer 1004 supplies the incoming frames to either a data bus 1008 or a pause frame bus 1010. The selection of either the data bus 1008 or the pause frame bus 1010 is performed in accordance with a control signal 1012. The data bus 1008 supplies the incoming frame to a receive buffer 1014. The receive buffer 1014 stores the incoming frames temporarily until they can be further processed. The receive buffer 1014 is coupled to a bus 1016 over which the stored frames within the received buffer 1014 can be retrieved for processing. The pulse frame bus 1010 supplies the incoming frame, which is designated to be a pause frame, to a pause frame register 1018. The pause frame is stored within the pause frame register 1018. All incoming frames that are not pause frames are supplied to the receive buffer 1014. Typically, the bus 1016 is accessible to a Central Processing Unit (CPU) of a computer system that includes a network communications integrated circuit that includes the transmission controller 1000.

In one embodiment, the control signal 1012 can be determined for each incoming frame by examining the destination address (DA) for the incoming frame. If the destination address (DA) of the frame indicates its a pause frame, then the control signal 1012 directs the multiplexer 1004 to supply the incoming frame to the pause frame bus 1010. On the other hand, if the destination address (DA) of the frame indicates its not a pause frame, then the control signal 1012 directs the multiplexer 1004 to supply the incoming frame to the receive buffer via the data bus 1008.

Once the pause frame register 1018 receives a pause frame, a pause controller 1020 accesses the pause frame stored in a pause frame register 1018 and causes the transmission of frames by the transmission controller 1000 to cease transmission for a period of time. The pause frame controller 1020 sends a pause control signal 1022 to a switch 1024. The switch 1024 is provided between a transmit buffer 1026 and a transmit side MAC 1028. The switch 1024 is coupled to the transmit side MAC 1028 over a data bus 1030.

Normally, the transmission controller 1000 will operate to freely transmit frames from the transmit buffer 1026 through the switch 1024 and the data bus 1030 to the transmit side MAC 1028. From the transmit side MAC 1028, the frames are transmitted over a physical medium and arrive at the remote station where they are received at the remote station's receive side MAC. However, when a pause frame is received by the receive side MAC 1002 and forwarded to the demultiplexer 1004 via the data link 1006, the control signal 1012 directs the frame to the pause frame register 1018. Once stored in the pause frame register 1018, the pause controller 1020 can evaluate the pause frame to determine the duration of the pause that is being requested. In accordance with the duration of the pause, the pause controller 1020 activates a pause request signal 1022 for the duration of the requested pause. In one embodiment, the duration can be provided by starting a timer for the period of the duration specified by the pause frame. In any case, once the duration has expired, the pause request signal 1022 is deactivated and the transmission of frames from the transmit buffer 1026 through the data bus 1030 to the transmit side MAC 1028 is, thereafter, allowed to continue, at least until a next pause frame is received.

The receive side MAC 1002 and the transmit side MAC 1028 together are conventionally referred to as a MAC layer 1032. In addition, the demultiplexer 1004, the pause frame register 1018, the pause controller 1020 and the switch 1024 are typically associated with a MAC control layer 1034.

The multiplexer 924 illustrated in FIG. 9 and the demultiplexer 1004 and the switch 1024 illustrated in FIG. 10 can be implemented as physical functional devices on the integrated circuit housing the reception controller 900 and the transmission controller 1000. Alternatively, these functional devices can be implemented logically by microcode, state machine, etc. Further, the pause frame controller 910 and the pause controller 1020 can be implemented in dedicated hardware or in a logical fashion through microcode, state machine, etc.

At each station, the reception controller 900 is integrated with the transmission controller 1000 and thus shares much of the circuitry, such as buffers and the MAC, even though shown separately in FIGS. 9 and 10. In particular, in such a case, the reception controller 900 and the transmission controller 1000 are provided in the same integrated circuit chip.

Figure 11:
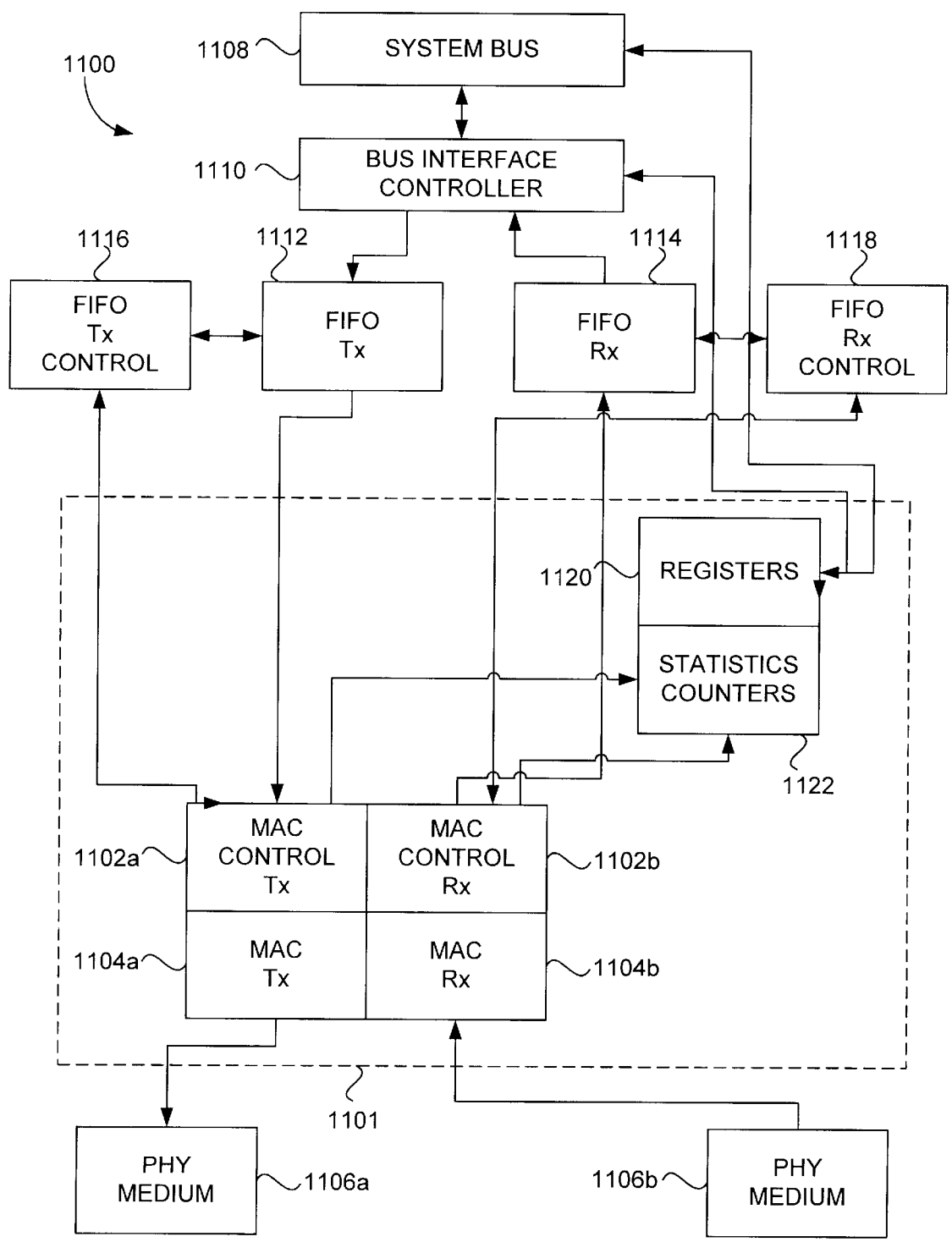
FIG. 11 is a block diagram of a representative embodiment of a network communication system according to an embodiment of the invention.

FIG. 11 is a block diagram of a representative embodiment of a network communication system 1100 according to an embodiment of the invention. The network communication system 1100 is implemented on a single integrated circuit chip. The network communication system 1100 provides integrated flow control.

The network communication system 1100 includes a transmission/reception controller 1101 that implements integrated flow control according to an embodiment of the invention. The transmission/reception controller 1101 includes a transmit (Tx) MAC control 1102a, a receive (Rx) MAC control 1102b, a transmit (Tx) MAC 1104a, and a receive (Rx) MAC 1104b. The transmit (Tx) MAC 1104a processes data received from a MAC control client (e.g., an upper LLC layer) that is to be transmitted over a physical medium 1106a, while the receive (Rx) MAC 1104b processes frames (network packets) received from a physical medium 1106b. The Tx MAC 1104a and the Rx MAC 1104b are shown to be coupled to the transmit MAC control 1102a and the receive MAC control 1102b. The MAC controls 1102a and 1102b are used to control transmit data flow and receive data flow. Further details of the MAC controls 1102a and 1102b where described above with reference to FIGS. 9 and 10.

From the transmission side, data is received from a MAC control client (e.g., an upper LLC layer) through a system bus 1108. The data is supplied over the system bus 1108 to a bus interface controller 1110. The data is then passed from the bus interface controller 1110 to a transmit buffer (Tx FIFO) 1112, which holds the data received from the upper LLC layer.

From the reception side, data is received from at the Rx MAC 1104b over the physical medium 1106b. The receive MAC control 1102b controls the storage of the data to the receive buffer (Rx FIFO) 1114 as well as the flow control according to the invention. The data can be read from the receive buffer (Rx FIFO) 1114 by the system bus 1108 via the bus interface controller 1110.

Both the transmit buffer (Tx FIFO) 1112 and a receive buffer (Rx FIFO) 1114 are shown being coupled to FIFO control blocks 1116 and 1118, respectively, which pass control information to the transmit MAC 204a and the receive MAC 204b. The FIFO control blocks 1116 and 1118 monitor the level of data storage in the transmit buffer (Tx FIFO) 1112 and the receive buffer (Rx FIFO) 1114.

The network communication system 1100 further includes registers 1120 and statistics counters 1122 that are used to account for and keep track of processing being performed in the Tx MAC 1104a and the Rx MAC 1104b. For flow control, the registers 1120 can include registers to store level thresholds, registers to store fields of a pause frame, and a timer register to count a pause duration. The registers 1120 can also include a mode register that indicates whether flow control is enabled.

Figure 12:
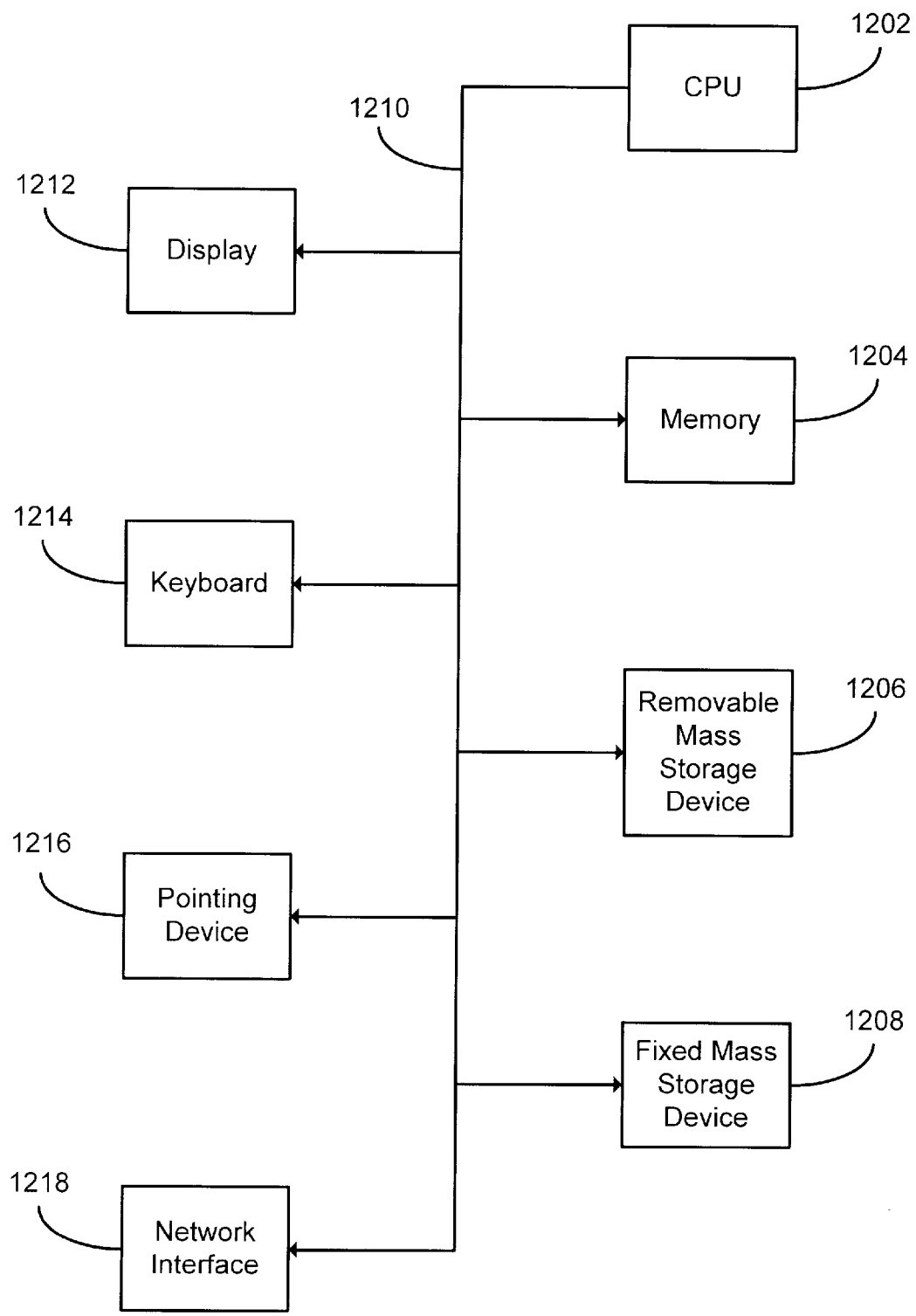
FIG. 12 is a block diagram of a general purpose computer system suitable for use with a network communication system according to an embodiment of the invention.

FIG. 12 is a block diagram of a general purpose computer system 1200 suitable for use with a network communication controller according to one embodiment of the invention. FIG. 12 illustrates one embodiment of a general purpose computer system, but it should be recognized that other computer system architectures and configurations can be used with the invention.

The computer system 1200, made up of various subsystems described below, includes at least one Central Processing Unit (CPU) (also referred to as a microprocessor) 1202 which controls the operation of the computer system 100. The CPU 1202 can be implemented by a single-chip processor or by multiple processors. Using instructions retrieved from memory 1204, the CPU 1202 controls the reception and manipulation of input data, and the output and display of data on output devices.

The CPU 1202 is coupled bi-directionally with the memory 1204 which can include a first primary storage, typically a random access memory (RAM), and a second primary storage area, typically a read-only memory (ROM). As is well known in the art, primary storage can be used as a general storage area for storage of input data and processed data as well as for storage of programming instructions and data.

A removable mass storage device 1206 provides additional data storage capacity for the computer system 1200, and is coupled either bi-directionally or uni-directionally to the CPU 1202. For example, a specific removable mass storage device commonly known as a CD-ROM typically passes data uni-directionally to the CPU 1202, whereas a floppy disk can pass data bi-directionally to the CPU 1202. The removable mass storage device 1206 can also include other computer-readable media such as magnetic tape, flash memory, signals embodied on a carrier wave, PC-CARDS, portable mass storage devices, holographic storage devices, and other storage devices. A fixed mass storage device 1208 can also provide additional data storage capacity. A common example of the fixed mass storage 1208 is a hard disk drive. The storage devices 1206 and 1208 generally store additional programming instructions, data, and the like that typically are not in active use by the CPU 1202.

In addition to providing the CPU 1202 access to storage subsystems, a bus 1210 can be used to provide access other subsystems and devices as well. For example, these other subsystems and devices can include a display monitor 1212, a keyboard 1214, a pointing device 1216, and a network interface 1218. The pointing device 1216 may be a mouse, stylus, track ball, or tablet, and is useful for interacting with a graphical user interface.

The network interface 1218 allows the CPU 1202 to be coupled to another computer, computer network, or telecommunications network using a network connection as shown. Through the network interface 1218, it is contemplated that the CPU 1202 might receive information, e.g., data or frames of data, from another device on a network, or might output information, e.g., data or frames of data, to another device through the network. The improved flow control according to the invention could be provided in the network interface 1218, which could be a network communications controller provided on an integrated circuit chip.

The advantages of the invention are numerous. Different implementations of the invention may have different advantages. One advantage of the invention is that pause frames can be sent more rapidly than conventionally possible. As a result, network performance tends to improve because network congestion and inter-chip latencies are able to be avoided. Another advantage of certain embodiments of the invention is that a user or system can programmably adjust or vary the amount of advance warning of buffer overflow and/or underflow.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An integrated circuit for supporting a network connection, said integrated circuit comprising:

a transmit buffer for storing outgoing frames to be transmitted to a remote station;

a receive buffer for storing incoming frames;

a pause frame controller that evaluates utilized capacity of said receive buffer and issues an internal pause frame request when the utilized capacity exceeds a threshold amount; and a pause frame generator, operatively connected to said pause frame controller, said pause frame generator generates a pause frame and causes the pause frame to be transmitted with priority over other outgoing frames to be transmitted when said pause frame controller issues the internal pause frame request.

2. An integrated circuit as recited in claim 1, wherein said integrated circuit further comprises:

a multiplexer operatively connected to said transmit buffer and said pause frame generator, said multiplexer selects one of the outgoing frames stored in said transmit buffer and the pause frame to be transmitted to the remote station.

3. An integrated circuit as recited in claim 2, wherein said multiplexer selects the pause frame as a next frame to be transmitted to the remote station when said pause frame controller issues the internal pause frame request.

4. An integrated circuit as recited in claim 2, said integrated circuit further comprises a media access control layer that controls the transmission and reception of frames, including the transmission of said pause frame.

5. An integrated circuit as recited in claim 1, wherein the network connection provides a connection to a local area network.

6. An integrated circuit as recited in claim 1, wherein the network connection provides a connection to a Ethernet network.

7. An integrated circuit as recited in claim 1, wherein said integrated circuit further comprises:

at least one flow control register operatively connected to said pause frame controller, said flow control register stores the at least one level threshold.

8. An integrated circuit as recited in claim 7, wherein said flow control register is externally accessible so that the at least one threshold level can be programmably altered.

9. An integrated circuit as recited in claim 7, wherein said pause frame generator comprises pause frame registers that store fields of the pause frame.

10. An integrated circuit as recited in claim 9, wherein said pause frame registers are externally accessible 50 that a pause frame time for the pause frame can be programmably altered.

11. An integrated circuit for supporting a network connection, said integrated circuit comprising:

a transmit buffer for storing outgoing frames to be transmitted to a remote station;

a receive buffer for storing incoming frames;

a pause frame controller that evaluates utilized capacity of said receive buffer and issues an internal pause frame request when the utilized capacity exceeds a threshold amount;

a pause frame generator, operatively connected to said pause frame controller, said pause frame generator generates a pause frame when said pause frame controller issues the internal pause frame request;

a multiplexer operatively connected to said transmit buffer and said pause frame generator, said multiplexer selects one of the outgoing frames stored in said transmit buffer and the pause frame to be transmitted to the remote station; and a media access control layer that controls the transmission and reception of frames, including the transmission of said pause frame, wherein said pause frame controller, said pause frame generator, and said multiplexer form at least a portion of a control sublayer for said media access controller layer.

12. A method for requesting a pause in transmission of data from a source station to a destination station, the source station and the destination station being coupled together in a full duplex manner, said method comprising:

(a) receiving a frame of data at the destination station from the source station;

(b) storing the received frame in a receive buffer;

(c) monitoring a level indicator that indicates extent to which the capacity of the receive buffer is being utilized;

(d) comparing the level indicator for the receive buffer with at least one level threshold;

(e) generating a pause frame to inform the source station of the available capacity of the receive buffer when said comparing (d) determines that the level indicator for the receive buffer does exceed the at least one level threshold; and (f) transmitting the pause frame from the destination station to the source station, the transmission of the pause frame given priority over other frames to be transmitted from the destination station.

13. A method as recited in claim 12, wherein said transmitting (f) provides the priority to the pause frame by transmitting the pause frame as a next frame to be transmitted.

14. A method as recited in claim 12, wherein the at least one level threshold is one of an almost full threshold and an almost empty threshold.

15. A method as recited in claim 12, wherein the at least one level threshold is an almost full threshold that set a threshold near but less than the maximum capacity of the receive buffer.

16. A method as recited in claim 12, wherein said comparing (d) comprises:

(d1) comparing the level indicator for the receive buffer with an upper level threshold; and (d2) comparing the level indicator for the receive buffer with a lower level threshold.

17. A method as recited in claim 16, wherein said generating (e) operates to generate the pause frame to inform the source station that the available capacity of the receive buffer either when said comparing (d1) determines that the level indicator for the receive buffer is greater than the upper level threshold or when said comparing (d2) determines that the level indicator for the receive buffer is less than the lower level threshold.

18. A method as recited in claim 16, wherein the pause frame includes a pause amount for which the source station is to pause transmitting frames to the destination station.

19. A method as recited in claim 18, wherein the pause frame generated has a zero pause amount when said comparing (d2) determines that the level indicator for the receive buffer is less than the lower level threshold.

20. A method as recited in claim 18, wherein the pause frame generated has a predetermined positive pause amount when said comparing (d1) determines that the level indicator for the receive buffer is greater than the upper level threshold.

21. A method as recited in claim 12, wherein the pause frame includes a pause amount for which the source station is to pause transmitting frames to the destination station.

22. A method as recited in claim 21, wherein said transmitting (f) provides the priority to the pause frame by transmitting the pause frame as a next frame to be transmitted.

23. A method as recited in claim 22, wherein the at least one level threshold is one of a almost full threshold and a almost empty threshold.

24. A system for providing flow control between stations of a network, said system comprising:

a first station; and a second station coupled to said first station in a full-duplexed manner via the network, wherein frames are transmitted between said first and second stations, wherein said first station includes a transmit buffer for storing outgoing frames to be transmitted to said second station; a receive buffer for storing incoming frames; a pause frame controller that evaluates utilized capacity of said receive buffer and issues an internal pause frame request when the utilized capacity exceeds a threshold amount; and a pause frame generator that generates a pause frame when said pause frame controller issues the internal pause frame request, wherein said first station transmits said pause frame to said second station with priority over other frames waiting to be transmitted to said second station, and wherein said second station includes a transmit buffer for storing outgoing frames to be transmitted to said first station; a receive buffer for storing incoming frames; and a frame controller that interrupts the transmission of outgoing frames for a period of time when said pause frame transmitted by said first station is received and detected at said second station.

25. A system as recited in claim 24, wherein said receive buffer, said pause frame controller and said pause frame generator are integrally provided in a single integrated circuit alone with MAC components.

* * * * *